United States Patent
Takahashi et al.

(10) Patent No.: US 9,821,748 B2
(45) Date of Patent: Nov. 21, 2017

(54) VEHICLE INTERIOR PANEL AND VEHICLE AIRBAG DEVICE

(71) Applicant: TOYODA GOSEI CO., LTD., Kiyosu-shi, Aichi-ken (JP)

(72) Inventors: Kenji Takahashi, Kiyosu (JP); Chiharu Totani, Kiyosu (JP); Takeshi Nagata, Kiyosu (JP); Junichi Fujita, Kiyosu (JP); Minoru Toda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/966,191

(22) Filed: Dec. 11, 2015

(65) Prior Publication Data

US 2016/0096502 A1    Apr. 7, 2016

Related U.S. Application Data

(62) Division of application No. 14/053,784, filed on Oct. 15, 2013, now abandoned.

(30) Foreign Application Priority Data

Oct. 22, 2012 (JP) .................. 2012-232977
Mar. 21, 2013 (JP) .................. 2013-058139

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
CPC ............... B60R 21/2165; B60R 21/205; B29L 2031/3008; B32B 5/026
See application file for complete search history.

(56) References Cited

U.S. PATENT DOCUMENTS

| | | |
|---|---|---|
| 5,590,901 A | 1/1997 | MacGregor |
| 5,839,752 A | 11/1998 | Yamasaki et al. |
| 5,865,461 A | 2/1999 | Totani et al. |
| 6,007,092 A | 12/1999 | Martz |
| 6,109,645 A | 8/2000 | Totani et al. |
| 6,199,897 B1 | 3/2001 | Kreile |
| 7,040,649 B2 | 5/2006 | Totani et al. |
| 7,556,284 B2 | 7/2009 | Riha et al. |

(Continued)

FOREIGN PATENT DOCUMENTS

| | | |
|---|---|---|
| CN | 101028811 A | 9/2007 |
| DE | 102005000176 A1 | 6/2007 |

(Continued)

OTHER PUBLICATIONS

Office Action dated Apr. 5, 2016 issued in the corresponding Japanese Patent Application No. 2013-058139 (and English translation).

(Continued)

*Primary Examiner* — Keith J Frisby
(74) *Attorney, Agent, or Firm* — Posz Law Group, PLC

(57) ABSTRACT

An instrument panel of an automobile includes a base and a covering bonded to a surface of the base. A cleavage groove is formed on the back of the base. When the base is cleaved by inflation pressure of an airbag, the cleavage groove serves as a starting point of the cleavage. The covering is formed by a ground fabric layer made of knitted fabric and a covering layer bonded the surface of the ground fabric layer. The ground fabric layer is formed of an original fabric in which the tensile strength in directions along its surface is anisotropic. The cleavage groove includes a first groove section, which is cleaved first. The covering is oriented with respect to the base such that the direction of the smallest tensile strength of the ground fabric layer matches with a direction perpendicular to the direction in which the first groove section extends.

4 Claims, 7 Drawing Sheets

(56) References Cited

U.S. PATENT DOCUMENTS

| | | |
|---|---|---|
| 7,673,896 B2 | 3/2010 | Yamada et al. |
| 8,132,307 B2 | 3/2012 | Aichner et al. |
| 2004/0126532 A1 | 7/2004 | Gardner, Jr. |
| 2005/0062271 A1 | 3/2005 | Heckl et al. |
| 2005/0140121 A1 | 6/2005 | Hayashi et al. |
| 2006/0226638 A1 | 10/2006 | Yasuda et al. |
| 2007/0205585 A1 | 9/2007 | Okada et al. |
| 2010/0117339 A1 | 5/2010 | Roring |
| 2011/0062686 A1 | 3/2011 | Buhler |
| 2011/0148079 A1 | 6/2011 | Dargavell et al. |

FOREIGN PATENT DOCUMENTS

| | | |
|---|---|---|
| DE | 102007062587 A1 | 5/2008 |
| EP | 0764563 A2 | 3/1997 |
| EP | 1547877 A2 | 6/2005 |
| EP | 2096006 A1 | 9/2009 |
| FR | 2830812 A1 | 4/2003 |
| FR | 2923759 A1 | 5/2009 |
| JP | 2000-071926 A | 3/2000 |
| JP | 2005-537164 A | 12/2005 |
| JP | 2006-289653 A | 10/2006 |
| JP | 2008-307934 A | 12/2008 |
| JP | 2009-208731 A | 9/2009 |
| JP | 2010-120566 A | 6/2010 |
| JP | 2012-153207 A | 8/2012 |

OTHER PUBLICATIONS

Office Action dated Jul. 22, 2015 in the corresponding CN application No. 201310487580.7 (with English translation).
European Search report dated Nov. 25, 2013 for corresponding EP application No. 13189210.1 (English Translation).

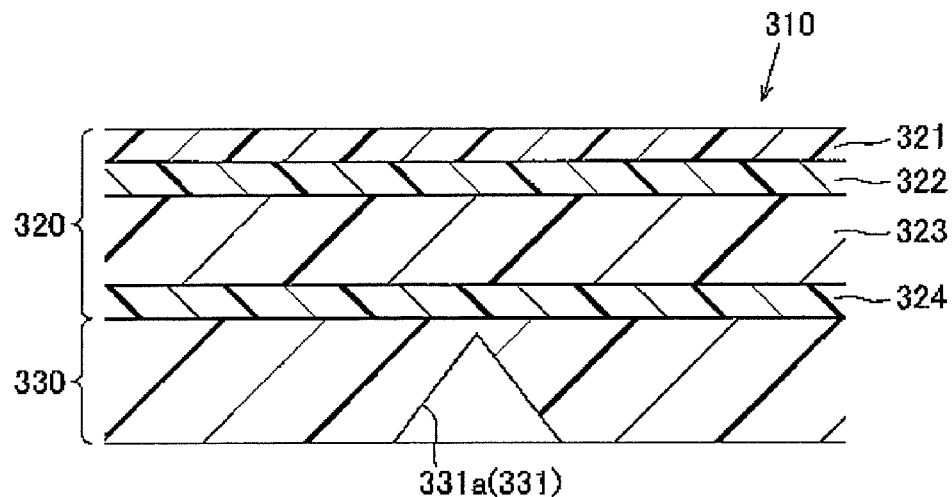
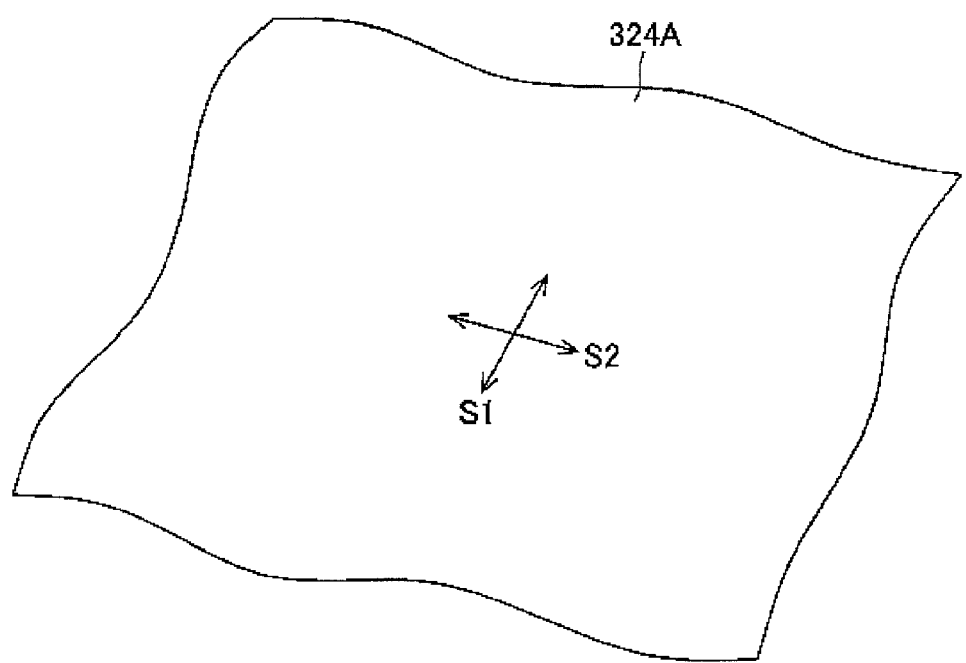

VEHICLE INTERIOR PANEL AND VEHICLE AIRBAG DEVICE

CROSS REFERENCE TO RELATED APPLICATIONS

This application is a divisional application of U.S. utility application Ser. No. 14/053,784 filed on Oct. 15, 2013, which is based on and claims priority to Japanese Patent Application No. 2012-232977 filed on Oct. 22, 2012, and Japanese Application No. 2013-058139 filed on Mar. 21, 2013, the disclosures of which are incorporated herein by reference.

BACKGROUND OF THE INVENTION

The present invention relates to a vehicle interior panel and a vehicle airbag device.

Conventionally, automobiles are equipped with an airbag device for a front passenger seat. For example, Japanese Laid-Open Patent Publication No. 2000-71926 discloses an airbag device that includes an instrument panel and an airbag module located on the back of the instrument panel. The airbag module includes an inflator, which generates inflation gas, and an airbag, which is inflated and deployed by the gas supplied by the inflator. The instrument panel has a base and a covering bonded to the surface of the base. A cleavage groove is formed on the back of the base. When the base is cleaved by inflation pressure of the airbag, the cleavage groove serves as a starting point of the cleavage.

In some cases, a cleavage groove is also formed on the back of a covering at a position corresponding to the cleavage groove of the base. An instrument panel that has such a covering allows the covering to be broken in a desirable manner along the cleavage groove of the covering when the base is cleaved. The cleavage groove of a covering is formed, for example, by the laser machining.

In the case of such an instrument panel and airbag device, a process is required for forming a cleavage groove on the covering. When the covering is bonded to the surface of the base, the positions of the covering and the base need to be adjusted such that the entire cleavage groove of the base and the entire cleavage groove of the covering are aligned with each other. This complicates the manufacturing process of the instrument panel.

In this respect, a covering may be made thinner to reduce the strength, so that the covering can be easily cleaved without any cleavage groove. In this case, however, the insufficient strength of the covering may degrade the durability of the instrument panel and the tactile sensation.

SUMMARY OF THE INVENTION

Accordingly, it is an objective of the present invention to provide a vehicle interior panel and a vehicle airbag device that, while ensuring the strength of a covering, allows the covering to be easily broken along a cleavage groove of a base by the inflation pressure of an airbag.

To achieve the foregoing objective and in accordance with one aspect of the present invention, a vehicle interior panel that is configured to be cleaved by an inflation pressure of an airbag is provided. The panel includes a base and a covering bonded to a surface of the base. The base has a back. A cleavage groove is formed on the back of the base. When the base is cleaved by inflation pressure of the airbag, the cleavage groove serves as a starting point of the cleavage. The covering is formed of an original fabric in which the tensile strength in directions along its surface is anisotropic. The cleavage groove includes a first groove section that is first cleaved when the cleavage groove is cleaved. The covering is bonded to the base such that a direction of the smallest tensile strength of the covering matches with a direction perpendicular to a direction in which the first groove section extends.

With this configuration, the tensile strength of the covering is set to be the smallest along a line perpendicular to the direction in which the first groove section, which is designed to be cleaved first in the cleavage groove, extends. This allows the corresponding part of the covering to be easily broken by the inflation pressure of the airbag. The tensile strength of the covering in directions other than the direction perpendicular to the extending direction of the first groove section, which is designed to be cleaved first in the cleavage groove, is relatively high so that the strength of the covering is maintained at a desirable level.

BRIEF DESCRIPTION OF THE DRAWINGS

FIG. 5 is a cross-sectional view of an instrument panel according to a second embodiment, showing a part that corresponds to FIG. 2;

FIG. 6 is diagram showing the anisotropy of the tensile strength in lines along a plane of an original fabric of a backing layer;

DETAILED DESCRIPTION OF THE PREFERRED EMBODIMENTS

First Embodiment

With reference to FIGS. 1 to 4, a vehicle interior panel and a vehicle airbag device according to a first embodiment will be described.

Figure 1:
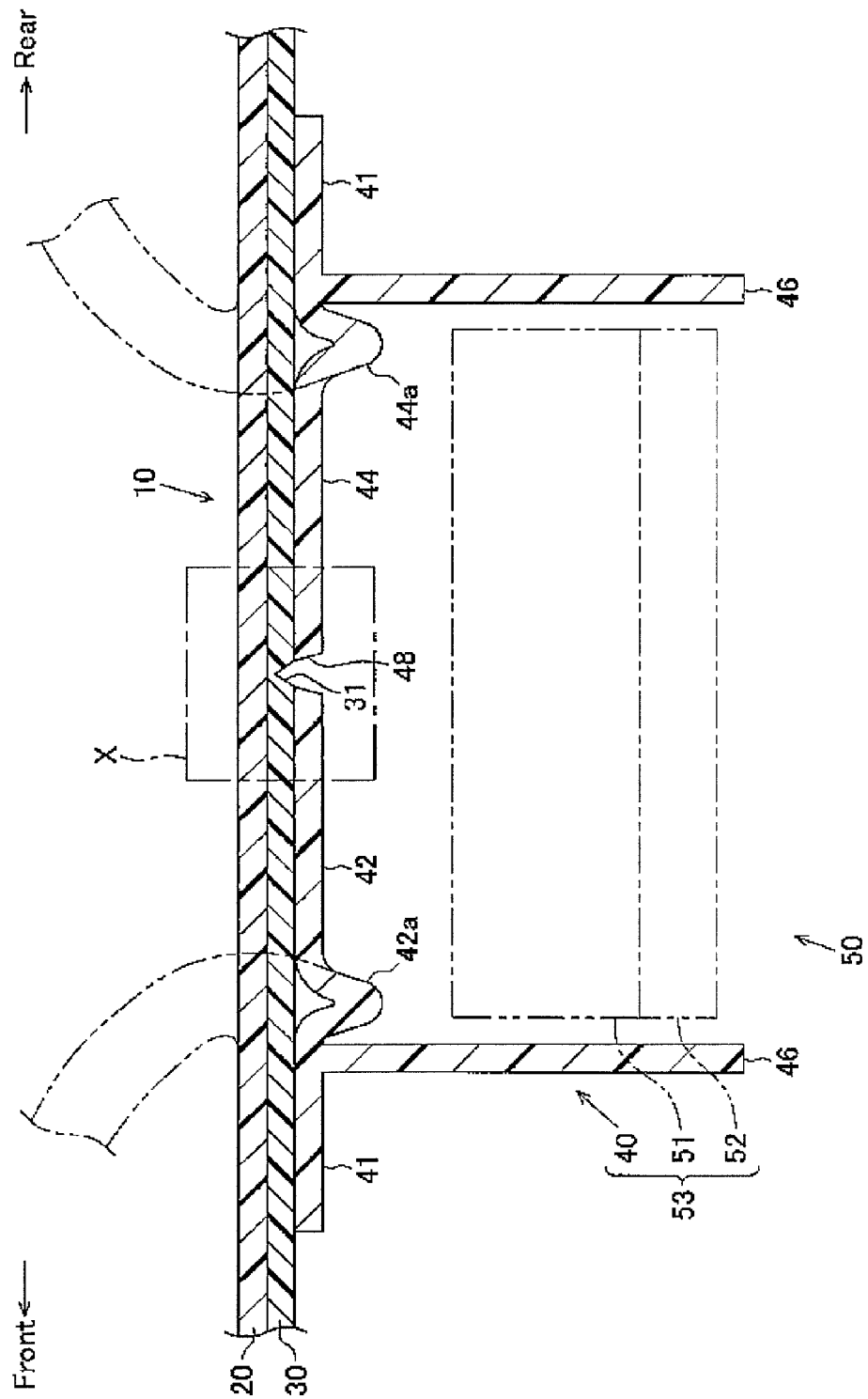
FIG. 1 is a cross-sectional view of an instrument panel according to a first embodiment, illustrating the cross-sectional structure of a part forming an airbag device for a front passenger seat.
Figure 2:
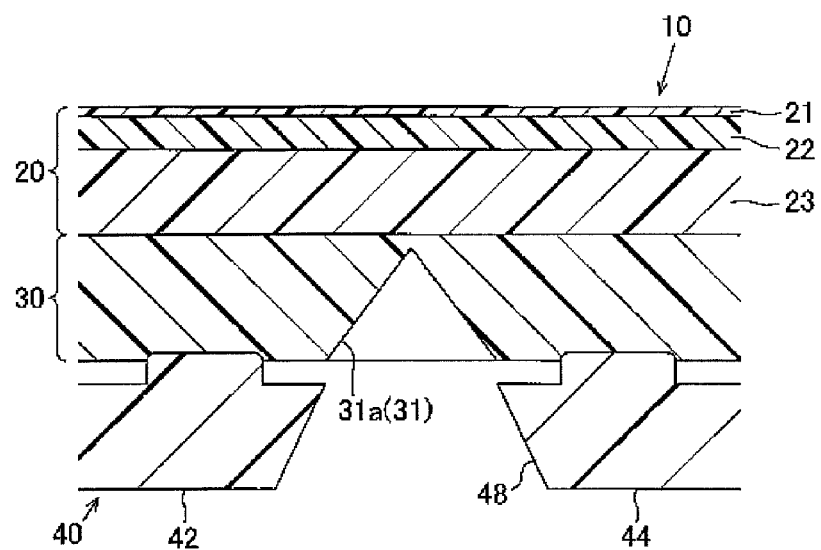
FIG. 2 is an enlarged cross-sectional view illustrating region X of FIG. 1.

As shown in FIGS. 1 and 2, an instrument panel 10 of an automobile extends in a lateral direction, which is perpendicular to the sheet of the drawing, and includes a core, which is a base 30, and a covering 20, which is bonded to the surface of the base 30. The base 30 is made of thermoplastic olefin, which is abbreviated as TPO, by injection molding.

The covering 20 has a three-layer structure with a cushion layer 23, a ground fabric layer 22, and a covering layer 21. The cushion layer 23 is made of, for example, polyurethane foam. The ground fabric layer 22 is made of, for example, a knitted fabric of plastic fibers, such as polyester, and boded to the surface of the cushion layer 23. The covering layer 21 is made of, for example, polyurethane and is bonded to the surface of the ground fabric layer 22. A backing (not shown), to which the base 30 is bonded, is bonded to the back of the cushion layer 23.

Figure 3:
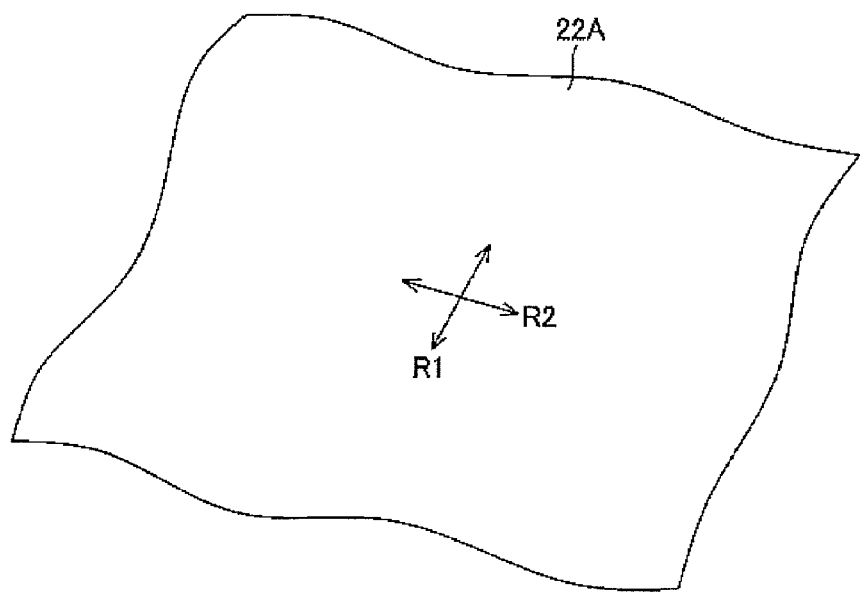
FIG. 3 is diagram showing the anisotropy of the tensile strength in lines along a plane of an original fabric of a ground fabric layer.

As shown in FIG. 3, an original fabric 22A of the ground fabric layer 22 has anisotropy of the tensile strength in directions along the surface. That is, the tensile strength of the original fabric 22A is set to be the smallest in a specific direction R1 along the surface of the original fabric 22A and is set to be the greatest in another direction R2, which is perpendicular to the direction R1.

The covering layer 21 has no anisotropy of the tensile strength in directions along its surface. Therefore, the tensile strength of the entire the covering 20 is the smallest in the direction R1.

As shown in FIG. 1, the automobile has a front passenger seat airbag device 50, which inflates to deploy an airbag 51 in front of a front passenger seat to protect an occupant seated in the seat from an impact when the impact is applied from the front.

A retainer 40 is provided on the back of the instrument panel 10 at a part that is located in front of the front passenger seat. The retainer 40 retains the airbag 51 in a folded state and an inflator 52, which generates inflation gas and supplies the gas to the airbag 51. The retainer 40, the inflator 52, and the airbag 51 form an airbag module 53.

The retainer 40 has a flat plate-shaped front and rear door portions 42 and 44, which extend along the back of the instrument panel 10. A through groove 48, which extends in the lateral direction, is formed between the front door portion 42 and the rear door portion 44. The front edge of the front door portion 42 and the rear edge of the rear door portion 44 have hinge portions 42a, 44a, respectively. The hinge portions 42a, 44a each have a folded shape. A basal portion 41, which extends along the back of the instrument panel 10, extends from each of the hinge portions 42a, 44a. A wall portion 46 is formed on the back of each basal portion 41 in a standing manner. The retainer 40 is made of thermoplastic olefin by injection molding. A plurality of protrusions (not shown) is formed on the surface of the basal portions 41, the front door portion 42, and the rear door portion 44. The protrusions are fixed to the back of the base 30 by vibration welding.

Figure 4:
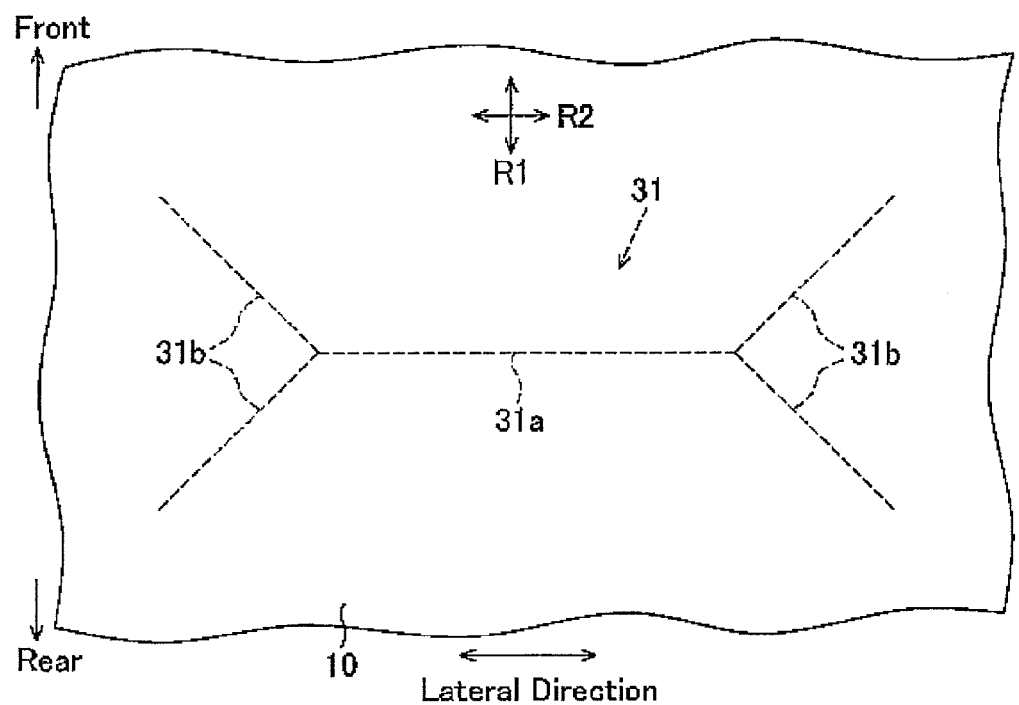
FIG. 4 is a plan view showing the relationship between the cleavage groove of the instrument panel and the tensile strength of the ground fabric layer in the first embodiment.

As shown in FIGS. 2 and 4, a cleavage groove 31 is formed on the back of base 30. When the base 30 is cleaved by the inflation pressure of the airbag 51, the cleavage groove 31 serves as a starting point of the cleavage. A part of the base 30 at which the cleavage groove 31 is located is formed to be thinner than the remaining part. The cleavage groove 31 can be formed by in-mold processing or end mill machining.

As shown in FIG. 4, the cleavage groove 31 includes a first groove section 31a, which extends in the lateral direction of the vehicle, and V-shaped second groove sections 31b, which extend outward and diagonally forward or rearward from both ends of the first groove section 31a. The covering 20 is oriented relative to the base 30 such that the direction R1, in which the tensile strength of the ground fabric layer 22 is the smallest, matches with the longitudinal direction of the vehicle.

The cleavage groove 31 is formed only in the base 30, and no cleavage groove is formed in the covering 20.

Operation of the present embodiment will now be described.

When an impact is applied to the automobile from the front, the inflator 52 supplies inflation gas to the airbag 51. This inflates the airbag 51 toward the door portions 42, 44 of the retainer 40, while being unfolded. The inflation pressure of the airbag 51 pushes the door portions 42, 44 of the retainer 40 outward while being supported by the hinge portions 42a, 44a, as illustrated by broken lines in which a long dash alternates with a pair of short dashes in FIG. 1.

At this time, since the door portions 42, 44 of the retainer 40 are pushed by the inflation pressure of the airbag 51, the base 30 of the instrument panel 10 is broken in the front-rear direction from the first groove section 31a serving as a starting point, and parts of the base 30 that correspond to the door portions 42, 44 are pushed and spread outward.

Also, since the tensile strength of the covering 20 is smallest in the longitudinal direction of the vehicle, a portion of the ground fabric layer 22 that corresponds to the first groove section 31a is smoothly broken in the front-rear direction.

The tensile strength of the covering 20 in direction other than the direction R1 is set to be relatively large, so that the strength of the covering 20 is maintained at a desirable level.

The vehicle interior panel and the vehicle airbag device described above have the following advantages.

(1) The covering 20 at least includes the ground fabric layer 22, which is formed of a knitted fabric, and the covering layer 21, which is bonded to the surface of the ground fabric layer 22, and the ground fabric layer 22 is formed of an original fabric in which the tensile strength in directions along its surface is anisotropic. In the cleavage groove 31, the first groove section 31a is cleaved first. The covering 20 is oriented with respect to the base 30 such that the direction of the smallest tensile strength of the ground fabric layer 22 matches with a direction perpendicular to the direction in which the first groove section 31a extends. This configuration allows the inflation pressure of the airbag 51 to easily break the covering 20 along the cleavage groove 31 of the base 30 without forming a cleavage groove in the covering 20, while ensuring a desirable level of strength of the covering 20. Therefore, the manufacturing process of the instrument panel 10 is simplified.

(2) The cleavage groove 31 is formed only in the base 30 and not in the covering 20. Therefore, compared to a case in which a cleavage groove is formed in the cushion layer of the covering, the manufacturing process of the covering 20 is simplified.

Second Embodiment

Next, a second embodiment will be described with reference to FIGS. 5 and 6.

Difference from the first embodiment will be described. Although not illustrated in FIG. 5, a retainer similar to that of the first embodiment is attached to the back of a base 330. The base 330 has a cleavage groove 331, which is similar to that in the first embodiment.

As shown in FIGS. 5 and 6, an instrument panel 310 of the present embodiment has a backing layer 324 bonded to the back of cushion layer 323. As shown in FIG. 6, an original fabric 324A of the backing layer 324 is made of unwoven fabric in which the tensile strength in directions along the surface is anisotropic. That is, the tensile strength of the original fabric 324A is set to be the smallest in a specific direction S1 along the surface of the original fabric 324A and is set to be the greatest in another direction S2, which is perpendicular to the direction S1. The covering 320 includes a ground fabric layer 322, a covering layer 321 bonded to the front of the ground fabric layer 322, a cushion layer 323 bonded to the back of the ground fabric layer 322, and a backing layer 324 bonded to the back of the cushion layer 323.

In the cleavage groove 331, the first groove section 331a is cleaved first. The covering 320 is oriented with respect to the base 330 such that the direction of the smallest tensile strength of the backing layer 324 matches with a direction perpendicular to the direction in which the first groove section 331a extends. That is, a direction S1, in which the tensile strength of the backing layer 324 is the smallest, is aligned with the direction R1, in which the tensile strength of the ground fabric layer 322 is the smallest.

Operation of the second embodiment will now be described.

For example, when a covering is bonded to the surface of the base 30 of the first embodiment, the covering 20 may receive a locally concentrated load depending on the shape of the base 30, which may tear the covering 20.

Accordingly, the fiber density of the backing layer may be increased to improve the tear strength of the covering 20, so that the covering 20 is harder to tear.

In this configuration, however, the tensile strength of the entire backing layer is increased, so that the breakage of the covering 20 by the inflation pressure of the airbag may be retarded.

In this respect, according to the present embodiment, the first groove section 331a is cleaved first in the cleavage groove 331, and the tensile strength of the ground fabric layer 322 and the backing layer 324 is set to the smallest in a direction perpendicular to the direction in which the first groove section 331a extends.

Therefore, when the inflation pressure of the airbag cleaves the base 330 of the instrument panel 310 in the front-rear direction from the first groove section 331a serving as a starting point, and the parts of the base 330 that correspond to the door portions are pushed spread outward, the part of the backing layer 324 that corresponds to the first groove section 331a is broken in the front-rear direction before being significantly stretched. Accordingly, a part of the ground fabric layer 322 that corresponds to the first groove section 331a starts receiving a tensile strength from an early stage, so that this part is broken in the front-rear direction before being significantly stretched.

Thus, the above described disadvantages are minimized while allowing the fiber density of the backing layer 324 to be increased.

The vehicle interior panel and the vehicle airbag device according to the above-mentioned second embodiment have the following advantage in addition to the advantages (1) to (2) of the first embodiment.

(3) The backing layer 324 is formed of the original fabric 324A, in which the tensile strength in directions along its surface is anisotropic. In the cleavage groove 331, the first groove section 331a is cleaved first. The covering 320 is oriented with respect to the base 330 such that the direction of the smallest tensile strength of the backing layer 324 matches with a direction perpendicular to the direction in which the first groove section 331a extends. According to this configuration, retardation of breakage of the covering 320 by the airbag inflation pressure is minimized, while allowing the fiber density of the backing layer 324 to be increased to retard tearing of the covering 320.

Third Embodiment

Next, a third embodiment will be described with reference to FIGS. 7 and 8.

Difference from the second embodiment will be described. Although not illustrated in FIG. 7, a retainer similar to that of the first embodiment is attached to the back of a base 430. The base 430 has a cleavage groove 431/first groove 431a, which is similar to that in the first embodiment.

To allow the covering to be easily broken by the inflation pressure of the airbag, the cushion layer is preferably formed of a foamed plastic such as polyurethane foam, which has a relatively low tensile strength, as in the first and second embodiments.

For example, in the instrument panel of a luxury car, an original fabric of raschel knitting, which is a type of warp knitting, is used for a cushion layer because of its luxurious tactile sensation.

However, an instrument panel that uses, as a cushion layer, a homogeneous original fabric made of foamed plastic has a tactile sensation that is greatly different from an instrument panel that uses original fabric made of warp knitting.

In this regard, the instrument panel of the third embodiment allows a covering to be easily broken by the inflation pressure of an airbag in the manner described below. Also, the tactile sensation of the instrument panel is made similar to one that uses an original fabric made of raschel knitting as a cushion layer.

Figure 7:
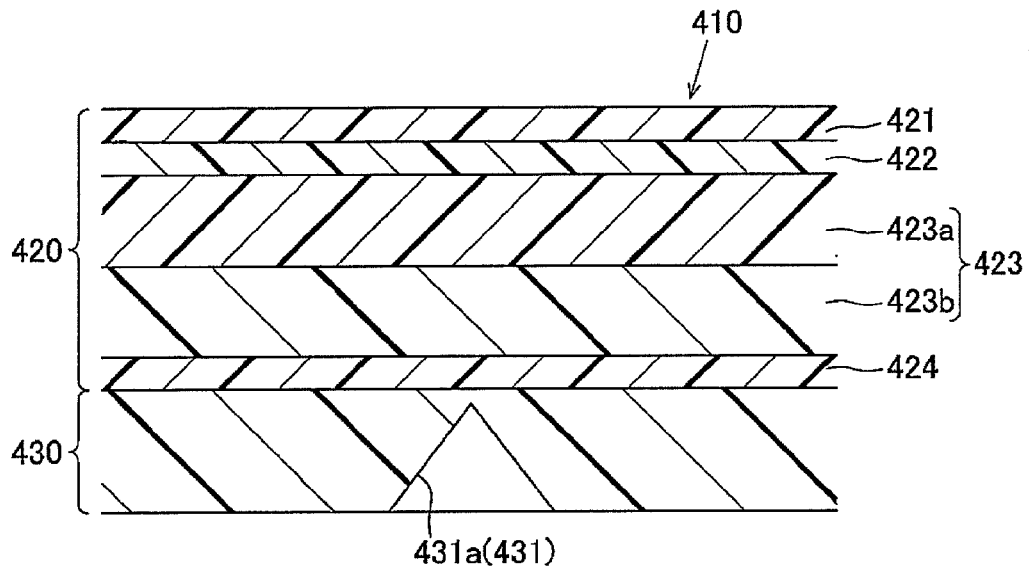
FIG. 7 is a cross-sectional view of an instrument panel according to a third embodiment, showing a part that corresponds to FIG. 2.

As shown in FIG. 7, a cushion layer 423 is formed by stacking two original fabric layers made of polyurethane foam of different densities. Specifically, the cushion layer 423 is made of a first cushion layer 423a and a second cushion layer 423b, which is heat welded to the back of the first cushion layer 423a. The density of the first cushion layer 423a is higher than that of the second cushion layer 423b. In other words, the first cushion layer 423a is made of a high-density polyurethane foam, while the second cushion layer 423b is made of low-density polyurethane foam. In the third embodiment, the thicknesses of the cushion layers 423a, 423b are substantially equal to each other.

The covering 420 includes a ground fabric layer 422, a cushion layer 423 bonded to the back of the ground fabric layer 422, and a backing layer 424 bonded to the back of the cushion layer 423. A covering layer 421 is bonded to the surface of the ground fabric layer 422.

Operation of the third embodiment will now be described.

Figure 8:
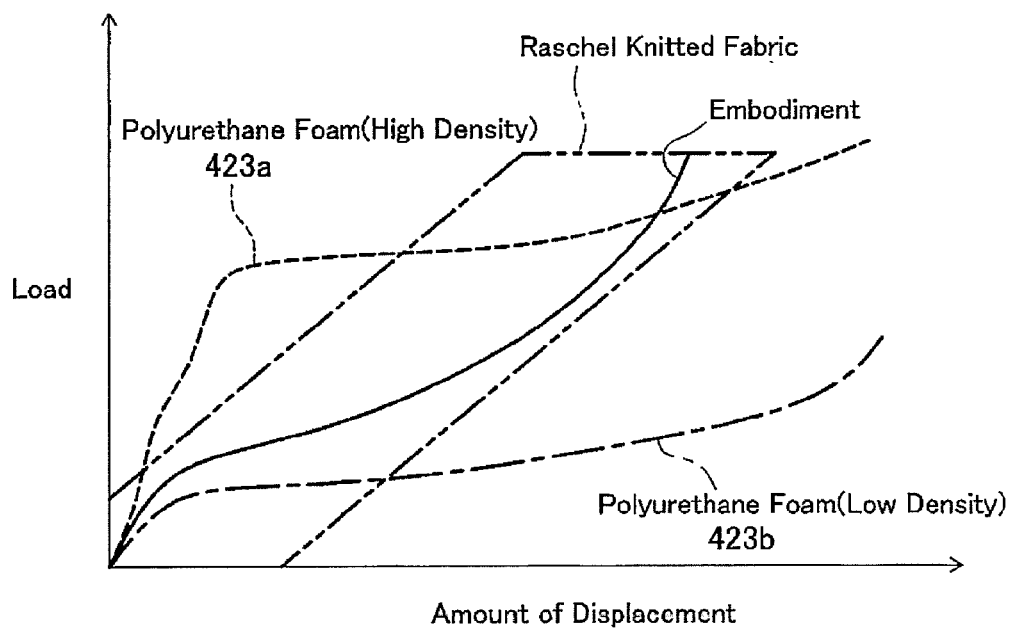
FIG. 8 is a graph showing the relationship between a displacement and a load of the instrument panel.

FIG. 8 shows tactile sensation property of an instrument panel. As shown in FIG. 8, in an instrument panel in which an original fabric made of raschel knitting is used as a cushion layer, changes in the load with respect to the amount of displacement fall within an applicable range indicated by broken lines in which a long dash alternates with a pair of short dashes.

In FIG. 8, a broken line indicates the tactile sensation property of an instrument panel in which only the first cushion layer 423a is used as a cushion layer. First, the load rapidly increases in relation to an increase in the displacement and surpasses the upper limit of the applicable range, which is shown by broken lines in which a long dash alternates with a pair of short dashes. Thereafter, the load gradually increases in relation to an increase in the displacement.

In FIG. 8, a line formed by a long dash alternating with a short dash indicates the tactile sensation property of an instrument panel in which only the second cushion layer 423b is used as a cushion layer. In this case, the load rapidly increases in relation to an increase of the displacement. However, since the second cushion layer 423b has a lower density and is softer than the first cushion layer 423a, the amount of increase of the load is relatively small in the whole range of the displacement.

The tactile sensation property of the instrument panel 410 of the third embodiment is indicated by a solid line in FIG. 8 and falls within the applicable range, which is surrounded by broken lines in which a long dash alternates with a pair of short dashes. That is, the tactile sensation property of the instrument panel 410 is made similar to that of an instrument panel that uses an original fabric made of raschel knitting.

The vehicle interior panel and the vehicle airbag device according to the above-mentioned third embodiment have the following advantage in addition to the advantages (1) to (2) of the first embodiment and the advantage (3) of the second embodiment.

(4) The cushion layer 423 is formed by stacking two original fabric layers made of polyurethane foam of different densities. This configuration allows the covering 420 to be easily broken by the inflation pressure of an airbag. Also, the tactile sensation of the instrument panel 410 is made similar to one that uses an original fabric made of raschel knitting as a cushion layer.

Fourth Embodiment

Figure 9:
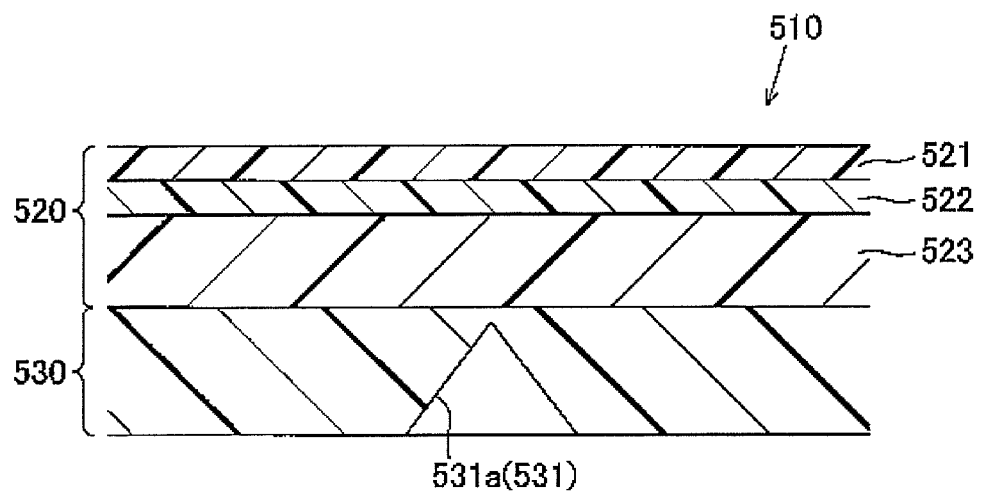
FIG. 9 is a cross-sectional view of an instrument panel according to a fourth embodiment, showing a part that corresponds to FIG. 2.
Figure 10:
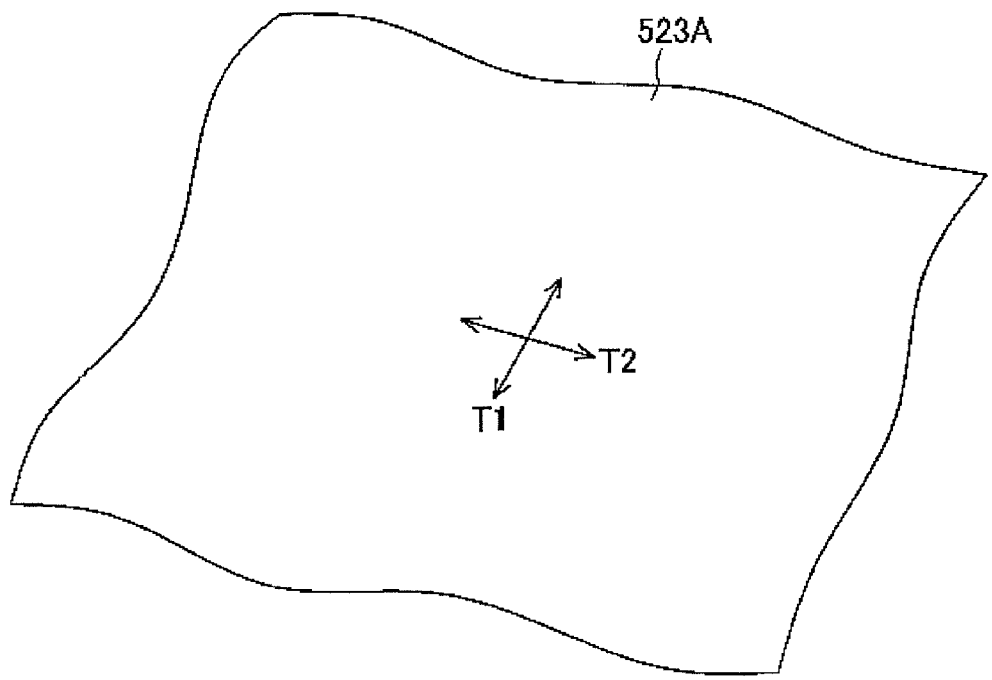
FIG. 10 is diagram showing the anisotropy of the tensile strength in lines along a plane of an original fabric of a cushion layer.

With reference to FIGS. 9 and 10, the differences between the fourth embodiment and the first embodiment will be mainly discussed. Although not illustrated in FIG. 9, a retainer similar to that of the first embodiment is attached to the back of a base 530. The base 530 has a cleavage groove 531, which is similar to that in the first embodiment. The covering 520 has a covering layer 521, which is similar to that in the first embodiment.

As shown in FIGS. 9 and 10, an original fabric 523A of a cushion layer 523 of an instrument panel 510 according to the present embodiment is made of raschel knitted fabric in which the tensile strength in directions along the surface is anisotropic. That is, the tensile strength of the original fabric 523A is set to be the smallest in a specific direction T1 along the surface of the original fabric 523A and is set to be the greatest in another direction T2, which is perpendicular to the direction T1.

In the cleavage groove 531, the first groove section 531a is cleaved first. The covering 520 is oriented with respect to the base 530 such that the direction of the smallest tensile strength of the cushion layer 523 matches with a direction perpendicular to the direction in which the first groove section 531a extends. That is, a direction T1, in which the tensile strength of the cushion layer 523 is the smallest, is aligned with the direction R1, in which the tensile strength of the ground fabric layer 522 is the smallest.

The vehicle interior panel and the vehicle airbag device according to the above-mentioned fourth embodiment have the following advantage in addition to the advantages (1) to (2) of the first embodiment.

(5) The cushion layer 523 is formed of the original fabric 523A, in which the tensile strength in directions along its surface is anisotropic. In the cleavage groove 531, the first groove section 531a is cleaved first. The covering 520 is oriented with respect to the base 530 such that the direction T1 of the smallest tensile strength of the cushion layer 523 matches with a direction perpendicular to the direction in which the first groove section 531a extends. With this configuration, the tensile strength of the cushion layer 523 is the smallest along a line perpendicular to the extending direction of the first groove section 531a, which is designed to be cleaved first in the cleavage groove 531. This allows the corresponding part of the covering 520 to be easily broken by the inflation pressure of the airbag.

Modifications

The vehicle interior panel and the vehicle airbag device according to the present invention are not to be restricted to configurations shown in the above embodiments, but may be modified as shown below.

Figure 11:
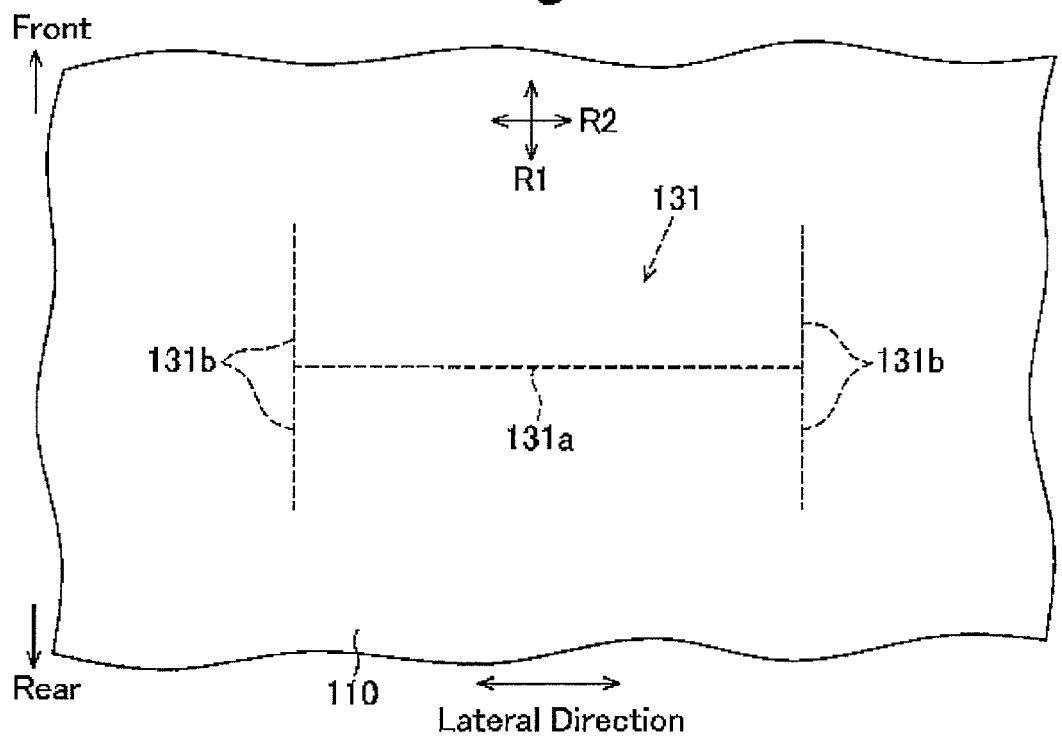
FIG. 11 is a plan view showing the relationship between the cleavage groove of the instrument panel and the tensile strength of the ground fabric layer in a modification.

As shown in FIG. 11, an H-shaped cleavage groove 131 may be employed in an instrument panel 110. That is, the cleavage groove 131 includes a first groove section 131a, which extends in the lateral direction of the vehicle, and second groove sections 131b, which extends forward or rearward from both ends of the first groove section 131a in the vehicle longitudinal direction. In this case also, it is only necessary to bond the covering to the base such that the direction in which the tensile strength of the ground fabric layer is the smallest matches with the longitudinal direction of the vehicle.

The first groove sections of the cleavage groove may be set to extend in the vehicle longitudinal direction. In this case also, it is only necessary to bond the covering to the base such that the direction in which the tensile strength of the ground fabric layer is the smallest matches with the lateral direction of the vehicle.

The direction perpendicular to the direction in which the first groove section extends, that is, the longitudinal direction of the vehicle does not necessarily need to be completely parallel with the direction in which the tensile strength of the ground fabric layer is the smallest. Even if the direction R1 slightly deviates from the direction perpendicular to the direction in which the first groove section extends, an advantage similar to the advantage (1) of the first embodiment will be achieved. The maximum allowable deviation of the direction R1 from the direction perpendicular to the direction in which the first groove section extends is five degrees. The base and the retainer may be formed of plastic materials other than thermoplastic olefin.

The ground fabric layer may be formed of a plastic fiber other than polyester. The ground fabric layer may be formed of nylon. Also, in place of the ground fabric layer 22 made of knitted fabric, a ground fabric layer made of a woven fabric may be employed.

The cushion layer may be formed of a foamed plastic other than polyurethane foam.

Figure 12:
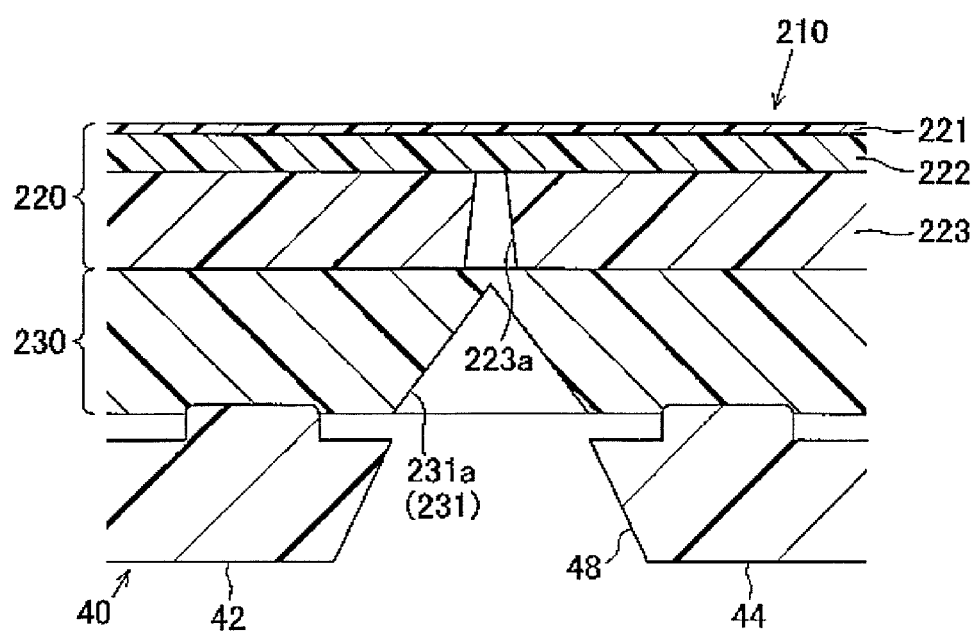
FIG. 12 is an enlarged cross-sectional view of an instrument panel according to another modification, showing a part that corresponds to FIG. 2.

As shown in FIG. 12, an instrument panel 210 includes a covering 220 and a base 230. The covering 220 further includes a covering layer 221, a ground fabric layer 222, and a cushion layer 223. A cleavage groove 223a may be formed in the cushion layer 223. In this case also, the ground fabric layer 222 can be easily broken by the inflation pressure of an airbag without forming a cleavage groove in the ground fabric layer 222. Therefore, compared to a case in which a cleavage groove is formed in the back of an original fabric forming a ground fabric layer, for example, by laser machining, machining process of the covering 220 is simplified. As with previous embodiments, a cleavage groove 231/first groove 231a is formed in the base 230.

In the second embodiment, the backing layer 324 is formed of an original fabric made of a nonwoven fabric. However, the backing layer may be formed of an original fabric that is not made of a nonwoven fabric, but made of, for example, a woven fabric or a film.

In the third embodiment, the cushion layer 423 is formed by stacking two cushion layers 423a, 423b. However, the cushion layer may be formed by stacking three or more cushion layers. Further, in the third embodiment, the cushion layers 423a, 423b, which have different densities, are stacked onto each other. Alternatively, other parameters of the tactile sensation property such as the rigidity and the thickness may be differentiated.

In the fourth embodiment, the cushion layer 523 is formed by the original fabric 523A made of raschel knitting. In place of this, the cushion layer may be formed by an original fabric formed by tricot knitting, which is one type of warp knitting.

A fabric may be employed in which the covering layer also has anisotropy of the tensile strength in directions along its surface. In this case, the covering and the ground fabric layer are preferably bonded to each other such that the direction in which the tensile strength of the covering layer is the smallest and the direction in which the tensile strength of the ground fabric layer is the smallest are matched.

The invention claimed is:

1. A vehicle interior panel that is configured to be cleaved by an inflation pressure of an airbag, the panel comprising:
    a base having a surface and a back;
    a covering bonded to the surface of the base,
    a cleavage groove formed on the back of the base, wherein, when the base is cleaved by inflation pressure of the airbag, the cleavage groove serves as a starting point of the cleavage,
   wherein the covering includes a ground fabric layer and a covering layer bonded to a surface of the ground fabric layer, the ground fabric layer being formed of an original fabric, in which the tensile strength of the original fabric in directions along its surface is anisotropic, and the tensile strength is set to be the smallest in a first direction along the surface of the original fabric and is set to be the greatest in a second direction, which is perpendicular to the first direction,
   wherein the cleavage groove includes a first groove section that is first cleaved when the cleavage groove is cleaved, and the covering is bonded to the base such that the first direction of the smallest tensile strength of the ground fabric layer of the covering matches with a direction perpendicular to a direction in which the first groove section extends,
   wherein there is no cleavage groove formed on the ground fabric layer,
   wherein the covering includes a cushion layer bonded to a back of the ground fabric layer, the cushion layer being made of an original fabric of raschel knitted fabric in which the tensile strength in directions along its surface is anisotropic.

2. The vehicle interior panel according to claim 1, wherein the interior panel is an instrument panel.

3. A vehicle airbag device formed by combining the interior panel according to claim 1 and an airbag module, wherein
    the interior panel includes a retainer on a back thereof, and
    the airbag module is formed by
    the airbag retained, in a folded state, by the retainer,
    an inflator that generates an inflation gas and supplies the gas to the airbag, and
    the retainer.

4. The vehicle interior panel according to claim 1, wherein a direction, in which the tensile strength of the cushion layer of the covering is the smallest, is aligned with the first direction, in which the tensile strength of the ground fabric layer is the smallest.

* * * * *